United States Patent
Kim

(10) Patent No.: US 9,551,897 B2
(45) Date of Patent: Jan. 24, 2017

(54) POLARIZING PLATE AND OPTICAL DISPLAY INCLUDING THE SAME

(71) Applicant: CHEIL INDUSTRIES INC., Gyeongsangbuk-do (KR)

(72) Inventor: Yong Woon Kim, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/169,052

(22) Filed: Jan. 30, 2014

(65) Prior Publication Data

US 2014/0211130 A1    Jul. 31, 2014

(30) Foreign Application Priority Data

Jan. 31, 2013   (KR) .................. 10-2013-0011025

(51) Int. Cl.
   *G02F 1/1335*   (2006.01)
   *G02B 5/30*     (2006.01)
   *G02F 1/13363*  (2006.01)

(52) U.S. Cl.
   CPC ....... *G02F 1/133528* (2013.01); *G02B 5/3016* (2013.01); *G02F 2001/133633* (2013.01)

(58) Field of Classification Search
   CPC ............... G02F 1/133528; G02F 2001/133633
   USPC .................................................. 349/96, 194
   See application file for complete search history.

(56) References Cited

U.S. PATENT DOCUMENTS

| | | | |
|---|---|---|---|
| 2001/0005253 A1* | 6/2001 | Komatsu | 349/141 |
| 2002/0021393 A1* | 2/2002 | Ochiai et al. | 349/137 |
| 2003/0025862 A1* | 2/2003 | Yoda | 349/117 |
| 2005/0030447 A1* | 2/2005 | Hsu et al. | 349/102 |
| 2005/0117217 A1* | 6/2005 | Yamaoka | G02B 5/3033 359/485.03 |
| 2008/0106675 A1 | 5/2008 | Uesaka et al. | |
| 2009/0207349 A1* | 8/2009 | Yoshimi et al. | 349/107 |
| 2012/0257145 A1 | 10/2012 | Lee et al. | |

FOREIGN PATENT DOCUMENTS

| | | |
|---|---|---|
| CN | 101256303 A | 9/2008 |
| CN | 101283296 A | 10/2008 |
| CN | 101506724 A | 8/2009 |
| CN | 102736159 A | 10/2012 |
| JP | 2009-122454 A | 6/2009 |
| KR | 10-2008-0032116 A | 4/2008 |

OTHER PUBLICATIONS

SIPO Office action dated Oct. 9, 2015 issued in corresponding CN Application No. 201410043351.0 (8 pages).
KIPO Office action dated Mar. 31, 2015 in priority Korean application No. 10-2013-0011025, 4 pages.

* cited by examiner

*Primary Examiner* — Lucy Chien
(74) *Attorney, Agent, or Firm* — Lewis Roca Rothgerber Christie LLP

(57) ABSTRACT

A polarizing plate includes a polarizer, and a protective film on one side of the polarizer and including a reverse dispersion liquid crystal coating layer having λ/4 retardation. An optical display panel includes the polarizing plate. The polarizing plate has a depolarization function and allows for viewing of the display panel through polarizing sunglasses.

12 Claims, 5 Drawing Sheets

(A)

(B)

PRIOR ART

POLARIZING PLATE AND OPTICAL DISPLAY INCLUDING THE SAME

CROSS-REFERENCE TO RELATED APPLICATION

This application claims priority to and the benefit of Korean Patent Application No. 10-2013-0011025, filed in the Korean Intellectual Property Office on Jan. 31, 2013, the entire content of which is incorporated herein by reference.

BACKGROUND

1. Field

The following description relates to a polarizing plate and an optical display including the same.

2. Description of the Related Art

Polarizing sunglasses include a polarizing film which filters light from the outside by allowing only light incident at a certain angle to be visible. Generally, polarizing sunglasses are used during driving or fishing.

However, when a display panel including a polarizing plate is viewed through polarizing sunglasses, the screen of the display may not be visible due to the perpendicular alignment of the polarizing plate of the display panel and the polarizing film of the sunglasses.

FIG. 1(A) shows a display including a liquid crystal panel 10, an upper polarizer 20 formed on an upper side of the liquid crystal panel 10, and a lower polarizer 30 formed on a lower side of the liquid crystal panel 10. If a polarizing film 40 of the polarizing sunglasses has an absorption axis parallel to that of the upper polarizer 20, a display image can be visible (indicated by the "O" mark on the left side). However, if the polarizing film 40 of the polarizing sunglasses has an absorption axis perpendicular to that of the upper polarizer 20, the display image is not visible (indicated by the "X" mark on the right side).

In an attempt to improve visibility, a polarizing plate as shown in FIG. 6 is usually used as an upper polarizing plate of the display. As shown in FIG. 6, a polarizing plate 4000 includes upper and lower protective films 340 and 320 formed on upper and lower sides of a polarizer 330, respectively; a retardation film 360 stacked on an upper side of the upper protective film 340 via an adhesive 350; and a hard coated-triacetyl cellulose film 380 stacked on an upper side of the retardation film 360 via an adhesive 370 to address low surface hardness of the retardation film 360. The polarizing plate 4000 is bonded to a display panel 300 via an adhesive 310.

The retardation film usually includes polycarbonate, polyethylene terephthalate, cycloolefin films, or the like. However, the polarizing plate prepared in this manner is thick and has low yield.

SUMMARY

In accordance with one or more aspects of embodiments of the present invention, a polarizing plate includes: a polarizer; and a protective film on an upper side of the polarizer and including a reverse dispersion liquid crystal coating layer.

In accordance with another aspect of the present invention, an optical display includes the polarizing plate.

DETAILED DESCRIPTION

Figure 1:
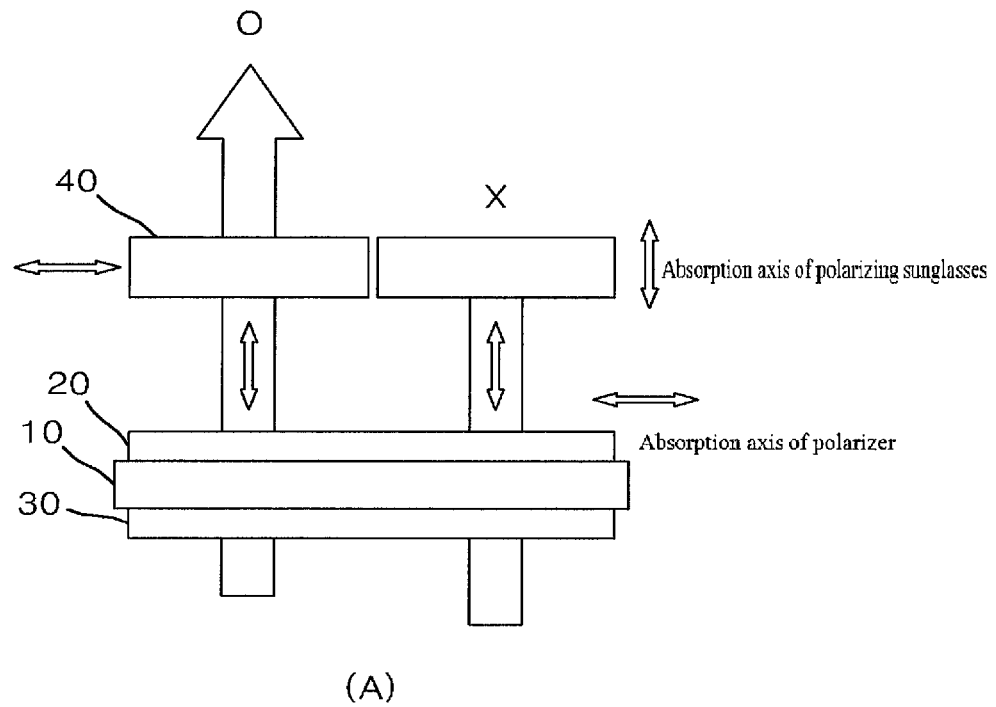
FIGS. 1(A) and 1(B) are conceptual diagrams illustrating depolarization by a polarizing plate.
Figure 1:
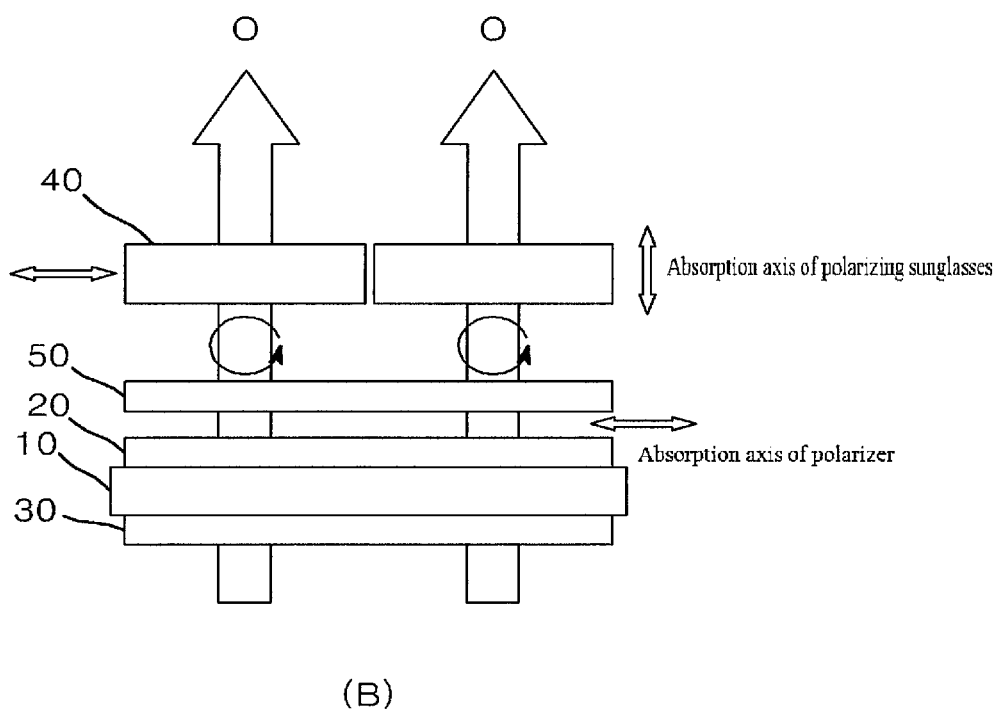

Embodiments of the present invention will be described with reference to the accompanying drawings. It should be understood that the present invention may be embodied in different ways and is not limited to the following embodiments. In the drawings, portions irrelevant to the description have been omitted for clarity. Like components are denoted by like reference numerals throughout the drawings and specification.

As used herein, terms such as "upper side" and "lower side" are defined with reference to the accompanying drawings. Thus, it will be understood that the term "upper side" can be used interchangeably with the term "lower side".

Expressions such as "at least one of" and "one of," when preceding a list of elements, modify the entire list of elements and do not modify the individual elements of the list. Further, the use of "may" when describing embodiments of the present invention refers to "one or more embodiments of the present invention."

In accordance with one embodiment of the present invention, a polarizing plate may include a polarizer, and a protective film on an upper side of the polarizer and including a reverse dispersion liquid crystal coating layer. The reverse dispersion liquid crystal coating layer has circular polarization due to $\lambda/4$ in-plane retardation and thus can provide depolarization when a display panel including the polarizing plate as an upper polarizing plate of the display panel is viewed through polarizing sunglasses.

FIG. 1 is a conceptual diagram illustrating depolarization by a polarizing plate when a display panel is viewed through polarizing sunglasses. FIG. 1(A) shows a polarizing plate free from a reverse dispersion liquid crystal coating layer 50, and FIG. 1(B) shows a polarizing plate including the reverse dispersion liquid crystal coating layer 50.

Referring to FIG. 1(A), when a display including a liquid crystal panel 10, an upper polarizer 20 on an upper side of the liquid crystal panel 10, and a lower polarizer 30 on a lower side of the liquid crystal panel 10 is viewed through polarizing sunglasses 40, images on the display may not be visible (a case denoted by "X" on the right side) if the upper polarizer 20 has an absorption axis perpendicular to that of the polarizing sunglasses 40. In contrast, referring to FIG. 1(B), since the reverse dispersion liquid crystal coating layer 50 achieves circular polarization due to $\lambda/4$ retardation and thus depolarizes the upper polarizer 20, the images on the display can be visible when viewed through the polarizing sunglasses 40 (a case denoted by "O" on the right side), even when the polarizing sunglasses 40 have an absorption axis perpendicular to that of the upper polarizer 20.

The polarizing plate may further include a functional layer on one surface of the protective film, for example, on an upper side of the protective film. The functional layer may be a hard coating layer, or the like. The hard coating layer improves hardness of the protective film and thus can improve hardness of the polarizing plate. In one embodiment, the functional layer may have a thickness of about 3 μm to about 50 μm.

The polarizing plate may further include a λ/2 retardation layer between the protective film and the reverse dispersion liquid crystal coating layer. The inclusion of the λ/2 retardation layer helps the polarizing plate to realize circular polarization.

The polarizing plate may further include a protective film on a lower side of the polarizer. Since the polarizing plate further includes the protective film, direct contact of the polarizer with the panel can be prevented, thereby reducing or preventing changes in polarization performance of the polarizer.

Hereinafter, a polarizing plate according to one embodiment of the invention will be described with reference to FIGS. 2 and 3.

Figure 2:
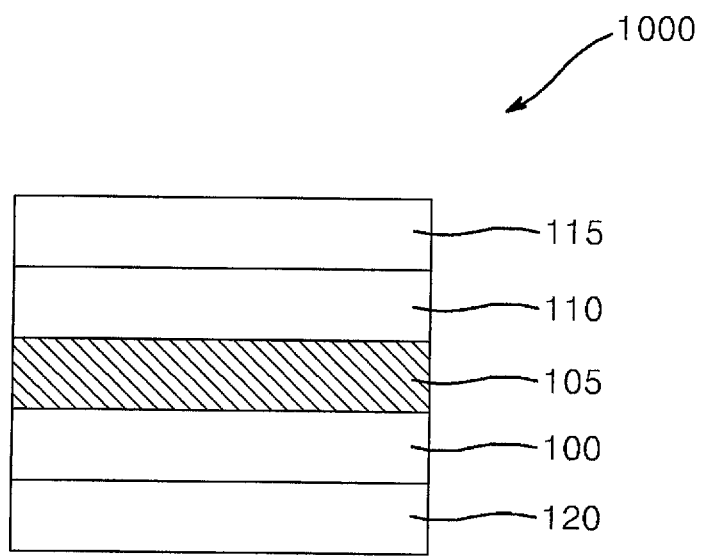
FIG. 2 is a cross-sectional view of a polarizing plate according to one embodiment of the present invention.

FIG. 2 is a sectional view of a polarizing plate according to one embodiment of the present invention. Referring to FIG. 2, a polarizing plate 1000 may include: a polarizer 100; a reverse dispersion liquid crystal coating layer 105 on an upper side of the polarizer 100; a first protective film 110 on an upper side of the reverse dispersion liquid crystal coating layer 105; a hard coating layer 115 on an upper side of the first protective film 110; and a second protective film 120 on a lower side of the polarizer 100.

The reverse dispersion liquid crystal coating layer 105 may have an in-plane retardation (Re) of about 100 nm to about 170 nm at a wavelength of 550 nm, as calculated using Equation 1, and an out-of-plane retardation (Rth) of about 60 nm to about 120 nm at a wavelength of 550 nm, as calculated using Equation 2. For example, the reverse dispersion liquid crystal coating layer 105 may have an in-plane retardation at a wavelength of 550 nm of about 100, 105, 110, 115, 120, 125, 130, 135, 140, 145, 150, 155, 160, 165 or 170 nm, and an out-of-plane retardation at a wavelength of 550 nm of about 60, 65, 70, 75, 80, 85, 90, 95, 100, 105, 110, 115 or 120 nm. Within any of these ranges, the polarizing plate can exhibit a high degree of depolarization.

$$Re = (nx - ny) \times d \quad \text{Equation 1}$$

$$Rth = ((nx + ny)/2 - nz) \times d \quad \text{Equation 2}$$

In Equations 1 and 2, nx, ny and nz are the refractive indices in x-, y- and z-axis directions, respectively, and d is the thickness of the liquid crystal coating layer in nm.

The reverse dispersion liquid crystal coating layer 105 may have an x-axis direction corresponding to the direction of coating of the reverse dispersion liquid crystal coating layer, a y-axis direction corresponding to the direction perpendicular to the direction of coating of the reverse dispersion liquid crystal coating layer, and a z-axis direction corresponding to the thickness direction of the reverse dispersion liquid crystal coating layer. The x-, y- and z-axes may be perpendicular to each other.

The reverse dispersion liquid crystal coating layer 105 may have a thickness of about 0.5 μm to about 10 μm. Within this range, the polarizing plate can exhibit circular polarization.

The reverse dispersion liquid crystal coating layer 105 may include at least one of nematic liquid crystals, cholesteric liquid crystals, and chiral smectic C liquid crystals. In one embodiment, the reverse dispersion liquid crystal coating layer 105 includes nematic monomolecular liquid crystals.

The reverse dispersion liquid crystal coating layer 105 may be prepared by any suitable method. For example, the reverse dispersion liquid crystal coating layer 105 may be prepared by coating an alignment layer onto one surface of a protective film; drying and curing the alignment layer; rubbing the alignment layer; and coating a liquid crystal coating solution including a liquid crystal polymer, a curing agent, a leveling agent and a solvent onto the alignment layer, followed by curing.

In some embodiments, coating the alignment layer includes coating an alignment layer resin onto the protective film in the form of a solution. The alignment layer resin may include any suitable resin, for example, monomers, oligomers or the like, which have a polymeric unsaturated bond, such as monofunctional (meth)acrylates or polyfunctional (meth)acrylates, ethers, amino groups, or the like.

In some embodiments, rubbing the alignment layer includes aligning the cured alignment layer in a certain direction on a surface by forcing the cured alignment layer to pass through a rubbing device. Rubbing the alignment layer may be performed, for example, by preparing a rubbing roll, to which a velvet-like cloth implanted with fibers such as rayon, nylon, cotton, aramid or the like is attached, and treating the alignment layer with the roll rotating at high speed, but embodiments of the invention are not limited thereto.

The liquid crystal layer may be prepared by coating the liquid crystals, followed by curing.

In some embodiments, liquid crystals are coated onto the surface of the alignment resin after the latter has been subjected to coating and drying. Coating may be performed by spin coating, without being limited thereto.

The polarizer 100 may include any suitable polarizer having polarization capabilities. In one embodiment, the polarizer may be a linear polarizer, which is formed by adsorption and alignment of a dichroic material to a polyvinyl alcohol resin, and is capable of absorbing linearly polarized light having an oscillation plane of a first direction and transmitting linearly polarized light having an oscillation plane of a second direction orthogonal to the first direction. The dichroic material may include iodine or dichroic organic dyes. In some embodiments, the polarizer may be prepared by uniaxially stretching a polyvinyl alcohol resin film, followed by dyeing the film with a dichroic material followed by treatment with boric acid.

The polarizer 100 may have a thickness of about 4 μm to about 30 μm.

The first protective film 110 may be a transparent protective layer and may protect the polarizer. Specifically, the first protective film 110 may be formed of at least one of cellulose, polyester, cyclic polyolefin, polycarbonate, polyether sulfone, polysulfone, polyamide, polyimide, polyolefin, polyarylate, polyvinyl alcohol, polyvinyl chloride, or polyvinylidene chloride films. In some embodiments, the protective film 110 is a triacetyl cellulose (TAC) film which is a cellulose film.

The first protective film 110 may have a thickness of about 10 μm to about 1000 μm, and in some embodiments of about 10 μm to about 100 μm or about 20 μm to about 80 μm. Within this range, the first protective film 110 can be stacked on the polarizer.

The hard coating layer 115 may be prepared by coating a composition for hard coating onto one surface of the first protective film, followed by drying, but embodiments of the invention are not limited thereto. The composition for hard coating may include, but is not limited to an acrylic resin or a urethane acrylic resin.

The second protective film 120 may be a transparent protective layer, for example, a film formed of at least one of cellulose, polyester, cyclic polyolefin, polycarbonate, polyether sulfone, polysulfone, polyamide, polyimide, polyolefin, polyarylate, polyvinyl alcohol, polyvinyl chloride, or polyvinylidene chloride films.

The second protective film 120 may have a thickness of about 10 μm to about 1000 μm, and in some embodiments of about 10 μm to about 100 μm or about 20 μm to about 80 μm. Within this range, the second protective film 120 can be stacked on the polarizer.

The polarizer, the reverse dispersion liquid crystal coating layer, the first protective film and the second protective film may be bonded to each other by a bonding layer, although the bonding layer is not shown in FIG. 2. The bonding layer may be formed of a water-based bonding agent, a pressure-sensitive bonding agent or the like, such as a polyvinyl alcohol bonding agent, a (meth)acrylic bonding agent, or the like.

The polarizing plate may have a thickness of about 100 μm to about 200 μm, and in some embodiments of about 100 μm to about 160 μm. Within any of these ranges, the polarizing plate can be applied to a liquid crystal display.

Figure 4:
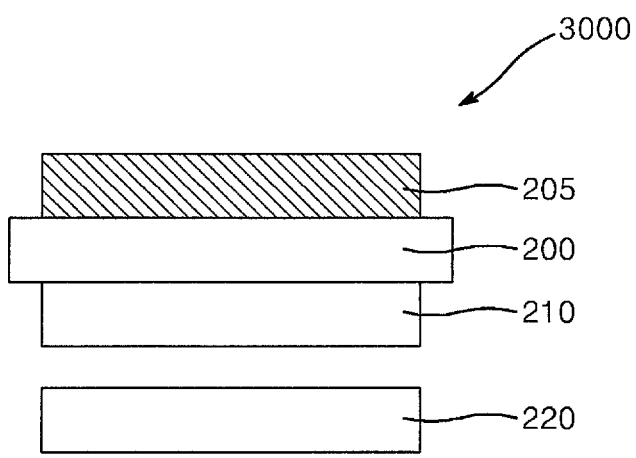
FIG. 4 is a cross-sectional view of an optical display according to one embodiment of the present invention.

The polarizing plate may be used as an upper polarizing plate 205 of a display panel. As shown in FIG. 4, the upper polarizing plate 205 of the display panel may refer to a polarizing plate formed on a side of a display panel 200 opposite to the side facing the backlight unit 220.

The polarizing plate may be stacked on the display panel via an adhesive layer, although the adhesive layer is not shown in FIG. 2. In some embodiments, the adhesive layer may include a (meth)acrylic copolymer as an adhesive resin, but is not limited thereto.

Figure 3:
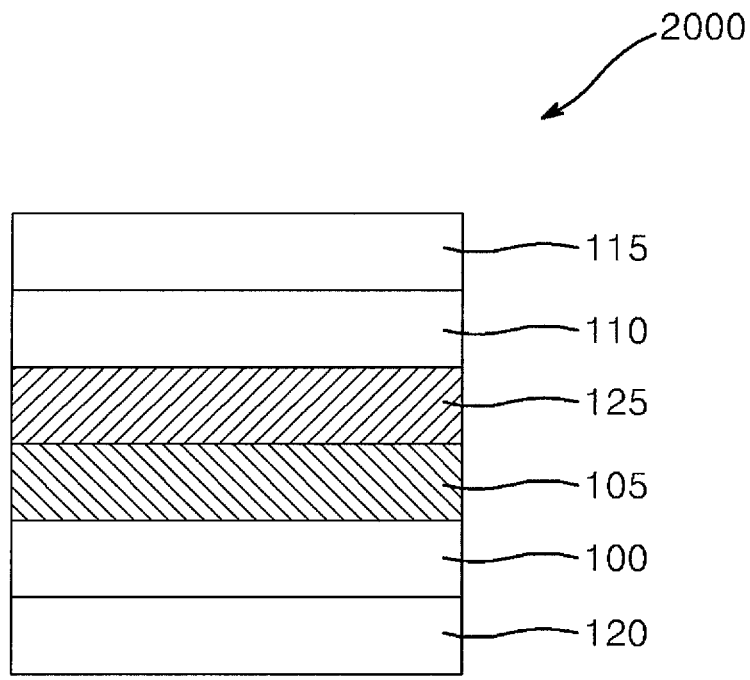
FIG. 3 is a cross-sectional view of a polarizing plate according to another embodiment of the present invention.

FIG. 3 is a sectional view of a polarizing plate according to another embodiment of the present invention. Referring to FIG. 3, a polarizing plate 2000 may include: a polarizer 100; a reverse dispersion liquid crystal coating layer 105 on an upper side of the polarizer 100; a λ/2 retardation layer 125 on an upper side of the reverse dispersion liquid crystal coating layer 105; a first protective film 110 on an upper side of the λ/2 retardation layer 125; a hard coating layer 115 on an upper side of the first protective film 110; and a second protective film 120 on a lower side of the polarizer 100. The polarizing plate 2000 is substantially the same as the polarizing plate described above, except that the λ/2 retardation layer 125 is included between the reverse dispersion liquid crystal coating layer 105 and the first protective film 110.

The λ/2 retardation layer 125 may have an in-plane retardation (Re) of about 240 nm to about 300 nm at a wavelength of 550 nm, as calculated using Equation 3, and an out-of-plane retardation (Rth) of about 120 nm to about 270 nm at a wavelength of 550 nm, as calculated using Equation 4. For example, the λ/2 retardation layer 125 may have an in-plane retardation at a wavelength of 550 nm of about 240, 245, 250, 255, 260, 265, 270, 275, 280, 285, 290, 295 or 300 nm, and an out-of-plane retardation at a wavelength of 550 nm of, about 120, 125, 130, 135, 140, 145, 150, 155, 160, 165, 170, 175, 180, 185, 190, 195, 200, 205, 210, 215, 220, 225, 230, 235, 240, 245, 250, 255, 260, 265 or 270 nm. Within any of these ranges, the polarizing plate can exhibit circular polarization.

$$Re = (n_x - n_y) \times d \quad \text{Equation 3}$$

$$Rth = ((n_x + n_y)/2 - n_z) \times d \quad \text{Equation 4}$$

In Equations 3 and 4, $n_x$, $n_y$ and $n_z$ are the refractive indices in the x-, y- and z-axis directions, respectively, and d is the thickness of the λ/2 retardation layer in nm.

The λ/2 retardation layer may have an x-axis direction corresponding to the direction of coating of the λ/2 retardation layer, a y-axis direction corresponding to the direction perpendicular to the direction of coating of the λ/2 retardation layer, and a z-axis direction corresponding to the thickness direction of the λ/2 retardation layer The x-, y- and z-axes may be perpendicular to each other. In other words, the x-axis of the λ/2 retardation layer corresponds to the longitudinal direction of the film (MD, machine direction), the y-axis corresponds to the width direction of the film (TD, transverse direction), and the z-axis direction corresponds to the thickness direction of the film, and the x-, y- and z-axes may be perpendicular to each other.

The λ/2 retardation layer may have a thickness of about 0.5 μm to about 70 μm. Within this range, the polarizing plate can exhibit circular polarization.

The λ/2 retardation layer may have any suitable form without limitation so long as the layer provides λ/2 retardation. For example, the λ/2 retardation layer may be a liquid crystal coating layer or a film. In one embodiment, the λ/2 retardation layer may be a liquid crystal coating layer formed by the same method as the aforementioned liquid crystal coating layer. In another embodiment, the λ/2 retardation layer may be a film. For example, the λ/2 retardation layer may be a film formed of olefins such as a cycloolefin polymer (COP), acrylics, celluloses, or a mixture thereof.

The λ/2 retardation layer 125 may be stacked on the reverse dispersion liquid crystal coating layer 105 via an adhesive layer, although the adhesive layer is not shown in FIG. 3. The adhesive layer may include an adhesive, such as a (meth)acrylic copolymer, as an adhesive resin. The adhesive layer may have a thickness of about 1 μm to about 30 μm.

In accordance with another aspect of the present invention, an optical display may include the polarizing plate according to embodiments of the present invention. FIG. 4 is a sectional view of an optical display according to one embodiment of the present invention.

Referring to FIG. 4, according to one embodiment of the invention, an optical display 3000 may include: a display panel 200; a first polarizing plate 205 on an upper side of the display panel 200; and a second polarizing plate 210 on a lower side of the display panel 200 and between the display panel 200 and a backlight unit 220. The first polarizing plate 205 may be the polarizing plate according to an embodiment of the invention.

The second polarizing plate 210 may be a conventional polarizing plate including a polarizer. In one embodiment, the second polarizing plate 210 may include: a polarizer; a first optical film on an upper side of the polarizer; and a second optical film on a lower side of the polarizer. The optical film may be at least one of a protective film or a retardation film.

The display panel 200 may include a liquid crystal layer, which includes liquid crystals of a horizontal mode, such as in-plane switching (IPS) mode, fringe field switching (FFS) mode or the like, a vertical alignment mode, or a twisted nematic (TN) mode.

A method of using the polarizing plate according to embodiments of the invention may include viewing a display screen of the optical display through polarizing sunglasses.

Hereinafter, the present invention will be described with reference to some examples. However, it should be noted that these examples are provided for illustration only and are not to be construed in any way as limiting the present invention.

Example 1

A polarizer was prepared by dyeing of a material for polarizers, followed by stretching, and the like. Specifically, a polyvinyl alcohol film (PS60, Kuraray Co., Ltd., Japan, thickness: 60 μm) was stretched to 2 times its initial length at 50° C., followed by iodine adsorption onto the polyvinyl alcohol film, and stretching again to 2.5 times the length of the stretched film in a boric acid solution at 40° C., thereby preparing a polarizer (thickness: 22 μm).

A reverse dispersion liquid crystal coating layer (liquid crystals: nematic monomolecular liquid crystals, thickness: 3.5 μm, Re: 148 nm and Rth: 100 nm at a wavelength of 550 nm) was coated onto one surface of a protective film HC TAC (hard coating-triacetyl cellulose, DNP Co., Ltd., Japan, thickness: 30 μm) by die coating.

The HC TAC including the reverse dispersion liquid crystal coating layer formed thereon was stacked on an upper side of the polarizer such that the reverse dispersion liquid crystal coating layer was bonded to the polarizer. A TAC film (TAC, DNP Co., Ltd, thickness: 40 μm) was bonded to a lower side of the polarizer as a protective film, thereby preparing a polarizing plate having the structure shown in FIG. 2.

Example 2

A polarizing plate having the structure shown in FIG. 3 was prepared in the same manner as in Example 1 except that a λ/2 retardation layer (thickness: 43 μm, Re: 260 nm and Rth: 130 nm at a wavelength of 550 nm) was further formed between the HC TAC film (used as the protective film) and the reverse dispersion liquid crystal coating layer.

Comparative Example 1

A polarizing plate was prepared as in Example 1 except that the reverse dispersion liquid crystal coating layer was omitted.

Comparative Example 2

Figure 6:
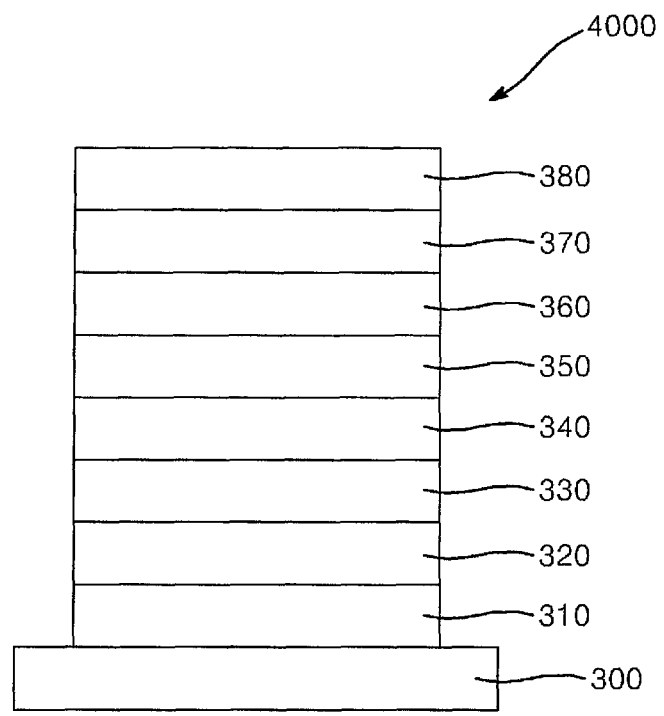
FIG. 6 is a cross-sectional view of a prior art polarizing plate for depolarization.

A polarizing plate having the structure shown FIG. 6 was prepared as in Example 1 except that a TAC film (as a protective film) and a cycloolefin film (ZD12-141158, Zeon Co., Ltd., thickness: 33 μm) (as a retardation film) were stacked instead of the reverse dispersion liquid crystal coating layer.

The polarizing plates prepared in Examples 1 and 2 and Comparative Examples 1 and 2 were evaluated as to the following properties. Results are shown in Table 1 and FIG. 5.

(1) Optical properties: transmittance, reflectance and degree of polarization of the polarizing plate were measured using a V-7100 (JASCO Co., Ltd., Japan).

(2) Haze: haze was measured on the polarizing plate using a haze meter.

(3) Visibility of screen during operation of display: after the polarizing plate was assembled as an upper polarizing plate of an LCD display panel and the LCD display panel was operated, a screen of the display was viewed through polarizing sunglasses. The instances when the screen was visible were rated as O, and the instances when the screen was not visible were rated as X.

TABLE 1

|  | Example 1 | Example 2 | Comparative Example 1 | Comparative Example 2 |
| --- | --- | --- | --- | --- |
| Thickness of polarizing plate (μm) | 114 | 117 | 110 | 173 |
| Transmittance (%) | 42.5 | 43.2 | 42.5 | 42.10 |
| Reflectance (%) | 5.4 | 5.4 | 5.4 | 5.4 |
| Degree of polarization (%) | 99.990 | 99.962 | 99.992 | 99.978 |
| Haze (%) | 1.2 | 1.3 | 0.8 | 1.4 |
| Visibility of screen | O | O | X | O |

As shown in Table 1, the polarizing plates according to embodiments of the present invention exhibited good optical properties and good hardness. In addition, as shown in part A of FIG. 5, when a display screen with the polarizing plate according to embodiments of the invention was viewed through the polarizing sunglasses, the screen was visible.

Thus, embodiments of the present invention provide a polarizing plate which has a depolarization function and allows for viewing of a display panel through polarizing sunglasses. In addition, the manufacturing process of the polarizing plate has fewer steps, since the process of laminating a film can be omitted.

Figure 5:
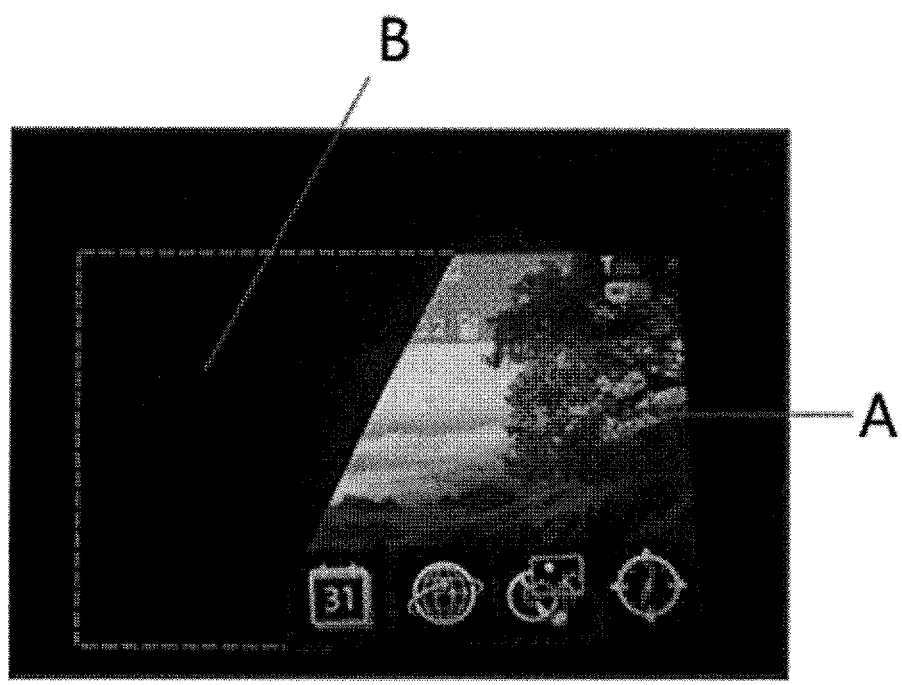
FIG. 5 shows the results of the operating states of the LCD panels to which polarizing plates according to Examples and Comparative Examples were bonded. Here, A shows the results of Examples 1 and 2 and Comparative Example 2, and B shows the results of Comparative Example 1.

In contrast, as shown in part B of FIG. 5, the screen of the display panel on which the polarizing plate of Comparative Example 1 (free from the liquid crystal coating layer) was mounted, could not be viewed through the polarizing sunglasses.

In addition, although the screen of the display panel was also visible when the polarizing plate of Comparative Example 2 was used, such polarizing plate had a significantly larger thickness than the polarizing plate according to embodiments of the invention.

While certain exemplary embodiments of the present invention have been illustrated and described herein, it should be understood that various modifications, changes, alterations, and equivalent embodiments can be made by those skilled in the art without departing from the spirit and scope of the invention. Instead, the scope of the present invention should be limited only by the accompanying claims and equivalents thereof.

What is claimed is:

1. A polarizing plate comprising:
   a first polarizer;
   a first protective film on a first side of the first polarizer; and
   a reverse dispersion liquid crystal coating layer on the first protective film, the reverse dispersion coating layer being bonded to the first polarizer between the first polarizer and the first protective film,
   wherein the reverse dispersion liquid crystal coating layer has an in-plane retardation (Re) of about 100 nm to about 170 nm at a wavelength of 550 nm, as calculated using Equation 1:

$$Re = (n_x - n_y) \times d, \quad \text{Equation 1}$$

wherein $n_x$ and $n_y$ are refractive indices in x- and y-axis directions, respectively, and d is a thickness of the reverse dispersion liquid crystal coating layer in nm.

2. The polarizing plate according to claim 1, wherein the reverse dispersion liquid crystal coating layer has λ/4 retardation.

3. The polarizing plate according to claim 1, wherein the reverse dispersion liquid crystal coating layer has a thickness of about 0.5 μm to about 10 μm.

4. The polarizing plate according to claim 1, wherein the first protective film comprises a material selected from the group consisting of cellulose, polyester, cyclic polyolefin, polycarbonate, polyether sulfone, polysulfone, polyamide, polyimide, polyolefin, polyarylate, polyvinyl alcohol, polyvinyl chloride, polyvinylidene chloride films, and combinations thereof.

5. The polarizing plate according to claim 1, further comprising a hard coating layer on a side of the first protective film opposite from the reverse dispersion liquid crystal coating layer.

6. The polarizing plate according to claim 1, further comprising a λ/2 retardation layer between the first protective film and the reverse dispersion liquid crystal coating layer.

7. The polarizing plate according to claim 6, wherein the λ/2 retardation layer has an in-plane retardation (Re) of about 240 nm to about 300 nm at a wavelength of 550 nm, as calculated using Equation 3:

$$Re=(nx-ny)\times d,\qquad \text{Equation 3}$$

wherein nx and ny are refractive indices in x- and y-axis directions, respectively, and d is a thickness of the λ/2 retardation layer in nm.

8. The polarizing plate according to claim 6, wherein the λ/2 retardation layer is a liquid crystal coating layer or a film.

9. The polarizing plate according to claim 6, wherein the λ/2 retardation layer has a thickness of about 0.5 μm to about 70 μm.

10. The polarizing plate according to claim 1, further comprising a second protective film on a second side of the first polarizer, opposite from the first side.

11. The polarizing plate according to claim 10, wherein the second protective film comprises a material selected from the group consisting of cellulose, polyester, cyclic polyolefin, polycarbonate, polyether sulfone, polysulfone, polyamide, polyimide, polyolefin, polyarylate, polyvinyl alcohol, polyvinyl chloride, polyvinylidene chloride films, and combinations thereof.

12. An optical display comprising:
a display panel;
a first polarizing plate on a first side of the display panel; and
a second polarizing plate between a second side of the display panel and a backlight unit,
wherein the first polarizing plate is the polarizing plate according to claim 1.

* * * * *